US011917369B2

(12) United States Patent
Talaslian et al.

(10) Patent No.: US 11,917,369 B2
(45) Date of Patent: Feb. 27, 2024

(54) EAR LEVEL PART FOR A HEARING DEVICE

(71) Applicant: SONOVA AG, Staefa (CH)

(72) Inventors: Ara Talaslian, Cambridge (CA); Mark Schmidt, Breslau (CA); Ming-Lun Dave Ma, Markham (CA); Rafael Tamsiran, Amersfoort (NL)

(73) Assignee: Sonova AG, Staefa (CH)

( * ) Notice: Subject to any disclaimer, the term of this patent is extended or adjusted under 35 U.S.C. 154(b) by 236 days.

(21) Appl. No.: 17/582,577

(22) Filed: Jan. 24, 2022

(65) Prior Publication Data

US 2022/0248147 A1 Aug. 4, 2022

(30) Foreign Application Priority Data

Jan. 29, 2021 (EP) .................................... 21154330

(51) Int. Cl.
*H04R 1/10* (2006.01)
*H04R 25/00* (2006.01)

(52) U.S. Cl.
CPC ......... *H04R 25/405* (2013.01); *H04R 25/607* (2019.05); *H04R 25/652* (2013.01); *H04R 2225/0213* (2019.05); *H04R 2225/0216* (2019.05)

(58) Field of Classification Search
CPC .... H04R 1/105; H04R 1/1016; H04R 1/1066; H04R 1/406; H04R 25/405; H04R 2225/025
See application file for complete search history.

(56) References Cited

U.S. PATENT DOCUMENTS

| | | | | |
|---|---|---|---|---|
| 5,712,453 | A * | 1/1998 | Bungardt | H04R 1/1066 181/135 |
| 6,819,762 | B2 * | 11/2004 | Jones | H04R 1/1025 379/430 |
| 7,379,557 | B2 * | 5/2008 | Chou | H04M 1/05 381/370 |
| 8,111,861 | B2 * | 2/2012 | Lowry | H04R 1/1016 381/328 |
| 8,526,600 | B2 * | 9/2013 | Howes | H04R 1/105 379/430 |
| 9,161,114 | B2 * | 10/2015 | Bone | H04R 1/1016 |
| 9,264,792 | B2 * | 2/2016 | Mainini | H04R 1/1058 |

(Continued)

OTHER PUBLICATIONS

"Extended European Search Report received in EP Application No. 21154330.1 dated Oct. 12, 2021".

*Primary Examiner* — Ryan Robinson
(74) *Attorney, Agent, or Firm* — ALG Intellectual Property, LLC

(57) ABSTRACT

An ear level part for a hearing device may include a body containing at least two microphones acoustically connected to at least two microphone openings, the at least two microphone openings arranged in a microphone line, the body further comprising a flange, wherein a receiver is arranged within the body, wherein the flange has a sound exit for the receiver; and an upper tab generally protruding in a lateral direction from the body and configured to be positioned above the tragus of a user's ear and a lower tab generally protruding in a lateral direction from the body and configured to be positioned beneath the tragus of the user's ear thereby aligning the ear level part.

16 Claims, 8 Drawing Sheets

(56) References Cited

U.S. PATENT DOCUMENTS

| | | | | |
|---|---|---|---|---|
| 9,386,365 | B2 * | 7/2016 | Burgett | H04R 1/1016 |
| 9,549,238 | B2 * | 1/2017 | Lott | H04R 1/1016 |
| 10,587,947 | B2 * | 3/2020 | Kelley | H04R 1/105 |
| 2007/0105598 | A1 * | 5/2007 | Varming | H04R 1/1016<br>455/569.1 |
| 2018/0242068 | A1 | 8/2018 | Kelley et al. | |
| 2019/0223747 | A1 | 7/2019 | Chou | |
| 2020/0162824 | A1 | 5/2020 | Meier | |

* cited by examiner

EAR LEVEL PART FOR A HEARING DEVICE

RELATED APPLICATIONS

The present application claims priority to EP Patent Application No. EP 21154330.1, filed Jan. 29, 2021, the contents of which are hereby incorporated by reference in their entirety.

BACKGROUND INFORMATION

Hearing devices, in particular for hearing impaired people, are known in the art. In so called Receiver-in-the-Canal (RIC) hearing devices, a speaker is placed within a hearing canal and connected by a cable to an on-the-ear component or behind-the-ear component. In the domain of hearing devices the speaker is referred to as a receiver.

There remains a need for an improved hearing device.

BRIEF DESCRIPTION OF THE DRAWINGS

The present disclosure will become more fully understood from the detailed description given hereinbelow and the accompanying drawings which are given by way of illustration only, and thus, are not limitive of the present disclosure, and wherein.

Corresponding parts are marked with the same reference symbols in all figures.

DETAILED DESCRIPTION

Figure 1:
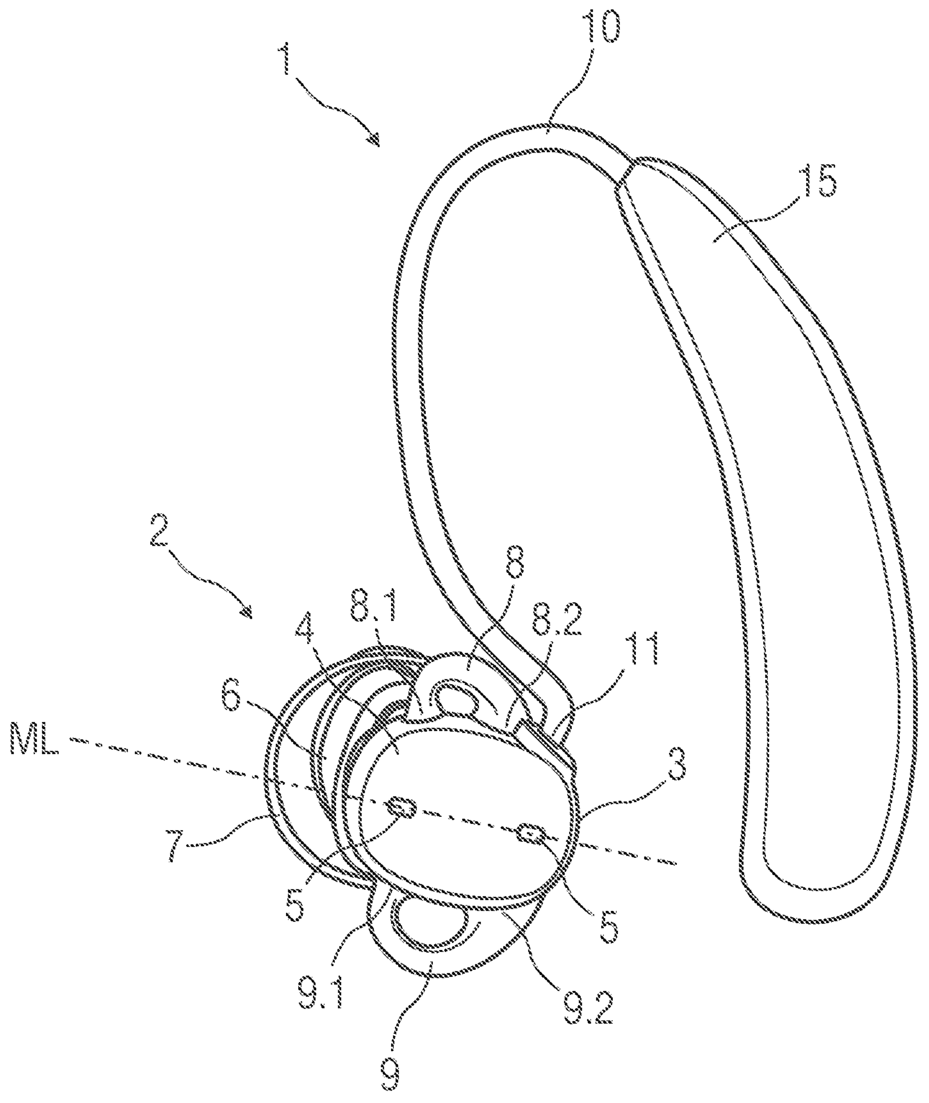
FIG. 1 is a schematic view of a hearing device configured as a receiver in the ear hearing device comprising an ear level part and a behind the ear part.

Described herein is an ear level part for a hearing device.

It is a feature of the present disclosure to provide an improved ear level part for a hearing device.

The term distal as used herein refers to a direction generally away from a user's body whereas the term medial refers to the opposite direction.

In some examples, an ear level part for a hearing device is provided, the ear level part comprising: a body containing at least two microphones acoustically connected to at least two microphone openings, the at least two microphones arranged in a microphone line, the body further comprising a flange, wherein a receiver is arranged within the body and wherein the flange has a sound exit for the receiver, an upper tab generally protruding in a lateral direction from the body and configured to be positioned above the tragus of a user's ear and a lower tab generally protruding in a lateral direction from the body and configured to be positioned beneath the tragus of the user's ear thereby aligning the ear level part in such a way that the microphone plane is horizontal or deviates by at most +/−15 degrees from a horizontal direction when the user maintains an upright head posture and/or in such a way that the microphone line lies on the tragus and/or in such a way that a perpendicular on the microphone line in the middle between the two microphones lies on the antitragus of the user's ear.

The upright head posture may be a head posture in which the person looks directly ahead. In an exemplary embodiment, the microphone line may lie on the tragus, in particular on a central region of the tragus, e.g. a central third, a central fourth, a central fifth, a central sixth, a central seventh or a central eighth of the tragus.

In an exemplary embodiment, the upper tab and the lower tab may be arranged such that a perpendicular on the microphone line in the middle between the two microphones lies on the antitragus, in particular on a central region of the antitragus, e.g. a central third, a central fourth, a central fifth, a central sixth, a central seventh or a central eighth of the antitragus.

In an exemplary embodiment, the upper tab is configured to be positioned between the tragus and the crus helicis and/or the lower tab is configured to be positioned between the tragus and the antitragus.

In an exemplary embodiment, the body has a generally oval cross section. This facilitates a smooth rounded surface without a sudden protrusions that could otherwise press into the ear and cause discomfort.

In an exemplary embodiment, the body comprises a face plate configured to point in a distal direction when the ear level part is in place within a user's ear, wherein the face plate comprises two or more microphone openings with a respective microphone arranged behind each of the microphone openings.

In an exemplary embodiment, the microphone line is in parallel or identical with a main axis of an oval cross section of the body.

In an exemplary embodiment, the flange has an oval cross section, wherein a main axis of the oval cross section of the flange is essentially perpendicular relative to the microphone line or deviates from being perpendicular by at most +/−15 degrees. Extensive research and statistical analysis of ear geometries have revealed that an oval cross section has the best properties in order to improve wearing comfort for the user and the acoustic properties of the dome.

In an exemplary embodiment, the ear level part further comprises:

a dome arranged at a medial end of the body, the dome comprising a socket and a collar, the collar being arranged at a medial end of the socket generally extending back in a distal direction thus at least partially enclosing the socket, wherein the collar is configured to flare in the distal direction, wherein the socket is connected with the flange thus connecting the dome to the body.

In an exemplary embodiment, the dome and/or the tabs are made of a soft and/or flexible material.

In an exemplary embodiment, the receiver is arranged within the flange. The advantage is that the receiver is located closer to the sound exit thus reducing losses.

In an exemplary embodiment, the upper tab and/or the lower tab comprise/comprises a loop defining an opening or eye generally extending in a distal or medial direction through the respective tab. The opening makes it easier to deform the tab, resulting in less discomfort in the ear.

In an exemplary embodiment, the loop of the upper tab and/or the lower tab has a first end and a second end respectively protruding from a lateral face of the body, wherein the first end protrudes in a direction which is closer to a radial direction while the second end protrudes in a direction which is closer to a tangential direction.

In an exemplary embodiment, the respective first end of the loops of each tab is positioned to be closer to the face of the user than the second end when the ear level part is worn within the user's ear.

In an exemplary embodiment, the upper tab is smaller than the lower tab.

In an exemplary embodiment, the ear level part further comprises: an exit point for a cable, the exit point arranged in a lateral face of the body next to the upper tab thus being configured to stabilize the position of the body, when the ear level part is inserted in the users ear.

In an exemplary embodiment, the exit point is next to the second end of the loop of the upper tab such that the second end is closer to the face of the user than the exit point when the ear level part is worn within the user's ear.

In an exemplary embodiment, the flange further comprises a vent, e.g. a simple vent or an active vent.

In an exemplary embodiment, the ear level part is part of a hearing device, further comprising a behind the ear part and a cable electrically connecting the behind the ear part to the ear level part.

In an exemplary embodiment, the cable is a flexible cable or a plastically deformable cable, in particular configured as described in EP 3 758 393 A1 which is hereby incorporated by reference in its entirety. This allows for individually bending the cable to bring it into a desired shape in which it remains to adapt it to the preferences and conditions of a particular user.

In an exemplary embodiment, the hearing device is a hearing aid.

The embodiments described herein are beneficial for hearing devices which are hearing aids. Hearing aids are worn by hearing disabled people. These people need to wear the hearing aid for a long time during the day and profit from the mechanical advantages and the possibility to enhance functionality of the device.

The solution as described above provides a hearing device maintaining good directional performance, i.e. a consistent ear level alignment for a microphone horizontal plane, and having comfortable fit for any individual so that it is usable as a one size fits all hearing device, where only one cable length/size may be provided for the user of the device. The single fixed length cable eliminates the need for selecting a cable (as in typical RIC hearing devices) and installation of the cable and still allows for a customizable and comfortable fit for both the behind the ear portion and the ear level piece of the system.

In another exemplary embodiment the cable may be a cable configured to connect a transducer module or In-the-Ear module comprising of multiple transducers or other electronic components.

Hearing instruments typically use a microphone to pick up/receive sound. Circuitry in the hearing instrument can process signals from the microphone and other types of sensors, and provide the processed sound signal into an ear canal of a user via a miniature loudspeaker, commonly referred to as a sound reproduction device or a receiver.

Microphones and receivers can be referred to as transducers.

In combining multiple transducers, for example microphones and receivers, into one module that is separated from a signal processing and drive unit via a single cable, the risk of cross-talking between input signals and output signals, e.g. audio signals and digital signals, and noise pick up dramatically increases when compared with situations where the microphones and receivers do not share a single cable. In particular, running receiver drive signals in parallel to microphone output signals can result in significant pollution of the microphone outputs. The magnitude of that effect depends on the receiver signal current and microphone output, line and input stage impedances.

The cable may comprise a plurality, e.g. an even number, of conductors, comprising conductors arranged in twisted pairs wound around a plastically deformable core wire, e.g. a forming wire. The cable is thus formable holding its resultant shape using a forming wire.

In an exemplary embodiment the core wire is made of a malleable material such as a metal or a plastic, e.g. a stainless-steel core wire.

In an exemplary embodiment at least one filler strand is arranged between two of the twisted pairs arranged next to each other.

In an exemplary embodiment at least one filler strand is arranged between two of the twisted pairs arranged next to each other in each case.

In an exemplary embodiment the filler strand is a made of non-conductive material such as plastic, e.g. a clear polyamide filler wire.

In an exemplary embodiment the core wire may be grounded.

In an exemplary embodiment at least one of the twisted pairs may be shielded by a respective shielding wrap arranged around said twisted pair.

In an exemplary embodiment, at least one end of the cable may comprise a connector comprising a plurality of pins respectively electrically connected to at least one of the conductors of the cable.

In an exemplary embodiment, the core wire may be mechanically fixed to the connector.

The cable may be used in a hearing device or a wearable device to connect a transducer module or In-the-Ear module comprising multiple transducers or electronic components such as transducers, sensors or sensor modules. Moreover, the cable may be used in a hearing device or a wearable device to connect any type of sensor or sensor module comprising multiple sensors and/or other components, e.g. at least one of a blood pressure sensor, a heart rate sensor, a microphone and a receiver.

The cable may be applied in a hearing device, further comprising an In-the-Ear module or transducer module comprising multiple electronic components such as transducers and sensors, wherein the cable connects the transducer module or In-the-Ear module, the transducer module or In-the-Ear module having at least two input lines and two output lines, wherein the two input lines are carried in one of the twisted pairs and/or wherein the two output lines are carried in one of the twisted pairs, e.g. in another one of the twisted pairs.

In an exemplary embodiment the transducer module or In-the-Ear module has at least two power supply lines carried in another one of the twisted pairs.

In an exemplary embodiment the transducer module or In-the-Ear module has at least two ground lines carried in another one of the twisted pairs.

In an exemplary embodiment the twisted pair conducting the input lines and/or the twisted pair conducting the output lines may be shielded by a respective shielding wrap arranged around said twisted pair.

In an exemplary embodiment the twisted pair conducting the input lines is arranged next to the twisted pair conducting the power supply lines and next to the twisted pair conducting the ground lines.

In an exemplary embodiment the twisted pair conducting the input lines is arranged next to the twisted pair conducting the power supply lines and next to the twisted pair conducting the output lines.

In an exemplary embodiment one or more, in particular two, filler strands are arranged between the twisted pair conducting the input lines and the twisted pair conducting the output lines, wherein one respective filler strand is arranged between all other pairs of twisted pairs arranged next to each other.

A kit may be provided, comprising two, three or more cables as described above, the cables having different lengths. This may facilitate a hearing aid professional to customize a hearing aid to the geometry of an ear of a user.

The cable aims at enabling the separation of a signal processing and power supply unit from a housing containing both input and output transducers by means of a single formable cable assembly.

The configuration of the cable enables a substantially reduced crosstalk and noise between relatively high current, low impedance signals such as those that would drive a receiver in a personal audio amplification device and low current, high impedance signals such as those that would carry a microphone signal in situations where these signal conductors share a common cable assembly and thus are physically in parallel by selectively twisting pairs of conductors. This in combination with a configurable core wire enables the user of the cable to manipulate and shape the cable to meet the application needs A reduction in crosstalk may allow for reduced potential for feedback where amplification is applied, reduced distortion and noise pickup, and improved sound quality.

The cable may be applied in a hearing aids, a hearable or a wearable.

Further scope of applicability of the present disclosure will become apparent from the detailed description given herein. However, it should be understood that the detailed description and specific examples, while indicating example embodiments, are given by way of illustration only, since various changes and modifications within the spirit and scope of the invention will become apparent to those skilled in the art from this detailed description.

Figure 2:
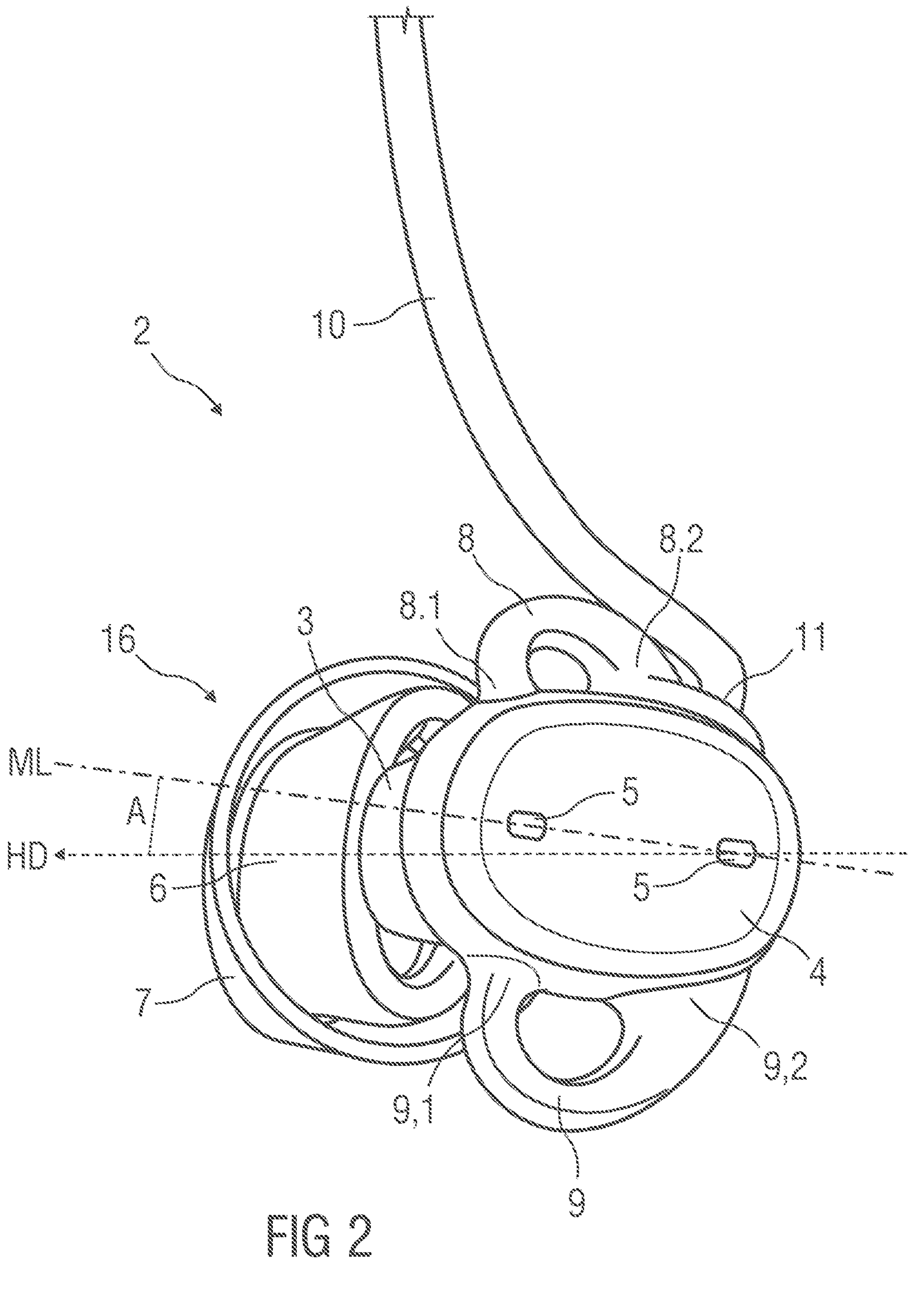
FIG. 2 is a schematic view of the ear level part.
Figure 6:
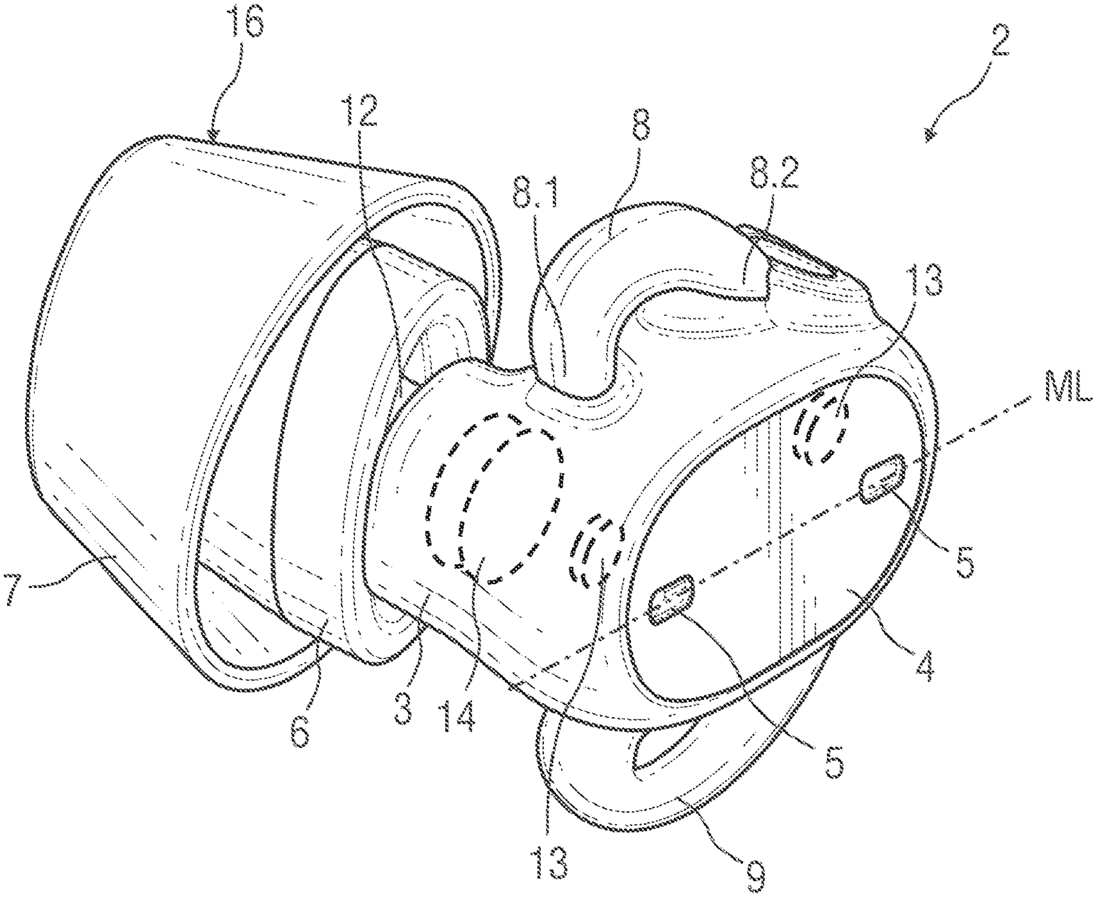
FIG. 6 is another schematic view of the ear level part.

FIG. 1 is a schematic view of a hearing device 1 configured as a receiver in the ear hearing device comprising an ear level part 2 and a behind the ear part 15. FIGS. 2 and 6 are schematic views of the ear level part 2.

The ear level part 2 is configured to be at least partially inserted into an ear canal of a user or an entrance of the ear canal and comprises a body 3 configured to receive electronic components, in particular two or more microphones 13 and a speaker which is also referred to as a receiver 14. The body 3 may generally have an oval cross section, e.g. a circular or elliptic cross section.

The body 3 may comprise a face plate 4 configured to point in a distal direction when the ear level part 2 is in place within a user's ear 20. The body 3 or the face plate 4 comprises two or more microphone openings 5 with a respective microphone 13 arranged behind each of the microphone openings 5. The two or more microphone openings 5 are arranged in a microphone line ML. The microphone line ML may be in parallel or identical with a main axis of the oval cross section of the body 3, wherein the main axis may be a longest symmetry axis or an only symmetry axis of the oval cross section of the body 3.

Figure 10:
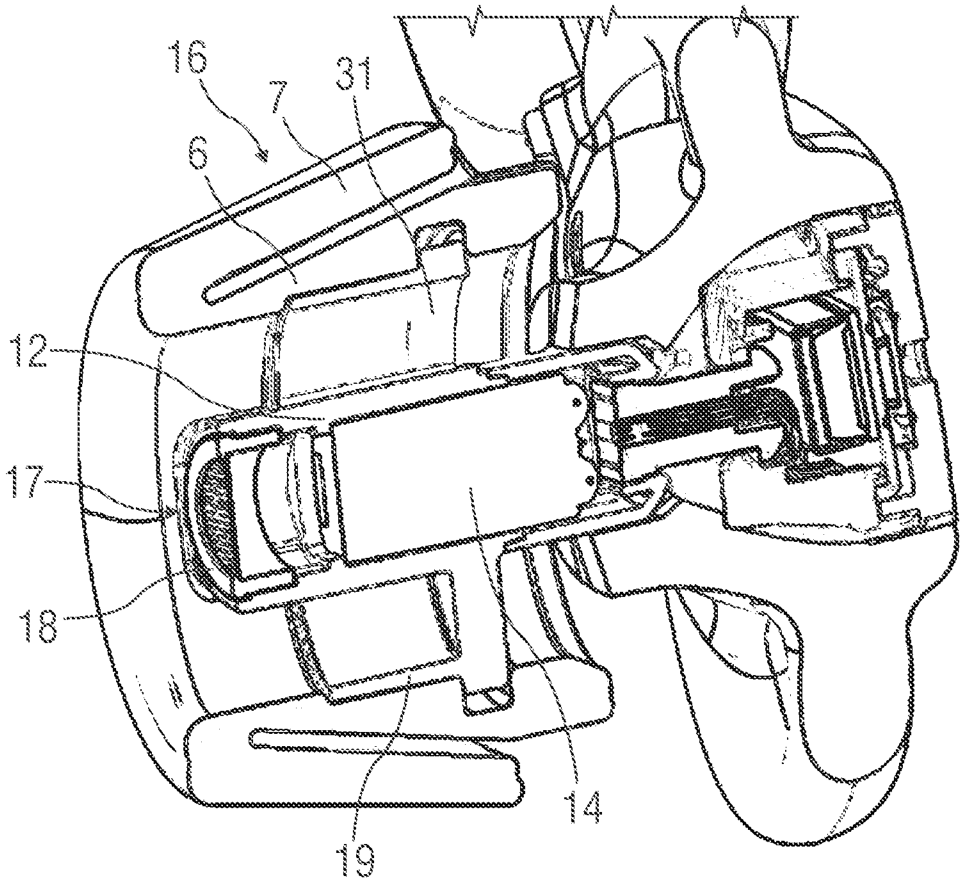
FIG. 10 is a schematic view of a flange.

The body 3 further comprises a flange 12 on a medial side, wherein the flange 12 has a sound exit 17 for the receiver 14. FIG. 10 is a schematic view of the flange 12. The sound exit 17 may be centrally arranged in the flange 12, i.e. dose or coaxial to a longitudinal axis. A medial end of the sound exit 17 may hold a filter 18 for preventing dirt and cerumen from entering. The flange 12 may further comprise a collar portion 19 having an oval cross section arranged about a pipe shaped part of the flange 12 holding the receiver 14 and/or defining the acoustic channel.

At a medial end of the body 3, i.e. an end which points in a medial direction when the ear level part 2 is in place within a user's ear 20, a dome 16 may be arranged, in particular releasably and/or replaceably arranged on the flange 12. The dome 16 may comprise a socket 6 and a collar 7, the collar 7 being arranged at a medial end of the socket 6 generally extending back in a distal direction thus at least partially enclosing the socket 6, wherein the collar 7 may be configured to flare in the distal direction, wherein the socket 6 is releasably connected with the flange 12 thus connecting the dome 16 to the body 3. The socket 6 may have an oval cross section, e.g. a circular or elliptic cross section. A main axis of the oval cross section of the socket 6 may be a longest symmetry axis or an only symmetry axis of the oval cross section of the socket 6. The main axis of the oval cross section of the socket 6 may be essentially perpendicular relative to the microphone line ML. The oval cross section may be inherent to the socket 6 or a result of the socket being arranged on the collar portion 19 of the flange 12. The flange 12 may hold the receiver 14 or be configured as an acoustic channel for propagating sound emitted by the receiver 14 if the receiver 14 is arranged within the body 3.

The dome 16 or the collar 7 may be made of a flexible material such as soft silicone rubber such that the collar 7 can accommodate to the shape of an ear canal or an entrance thereof. The fact that the collar 7 flares when in the relaxed state facilitates retaining the ear level part 2 in an ear 20 of a user. The body 3 may be made from the same material or from a different material than the dome 16.

The body 3 further comprises an upper tab 8 generally protruding in a lateral direction which is at least essentially perpendicular to the distal direction or the medial direction. Moreover, the body 3 further comprises a lower tab 9 generally protruding in a lateral direction which is at least essentially perpendicular to the distal direction or the medial direction, wherein the lower tab 9 may point in a direction at least essentially opposite the direction in which the upper tab 8 points. In an exemplary embodiment the directions in which the upper tab 8 and the lower tab 9 point are at least essentially in parallel with the main axis of the dome 16.

The upper tab 8 and the lower tab 9 may respectively comprise a loop defining an opening or eye generally extending in a distal or medial direction through the respective tab 8, 9. The upper tab 8 and the lower tab 9 may respectively have an asymmetrical shape, in particular such that a first end 8.1, 9.1 of the loop protrudes from a lateral face of the body 3 in an essentially radial direction (with respect to an axis pointing in the distal or medial direction) or at least in a direction which is closer to said radial direction while a second end 8.2, 9.2 of the loop protrudes from the lateral face of the body 3 in an essentially tangential direction or at least in a direction which is closer to said tangential direction than to said radial direction. The upper tab 8 and the lower tab 9 therefore resemble handles of a cup. In an exemplary embodiment, the respective first end 8.1, 9.1 of the loops of each tab 8, 9 is configured to be closer to the face of the user than the second end 8.2, 9.2 when the ear level part 2 is worn within the user's ear. In particular, the tabs 8 and 9 may be arranged such that the body 3, when seen from the distal direction, resembles a two-handled cup. In an exemplary embodiment, the upper tab 8 may be smaller than the lower tab 9, e.g. have a smaller loop and eye. In an exemplary embodiment the tabs 8, 9 are made from a flexible material allowing the tabs 8, 9 to accommodate to a user's concha 21. In an exemplary embodiment, the upper tab 8 is configured to be positioned above a tragus 22 while the lower tab 9 is configured to be positioned beneath the tragus 22.

In an exemplary embodiment, the upper tab 8 and the lower tab 9 may be arranged closer to a forward one than to a rearward one of the microphones 13, wherein the forward one of the microphones 13 is the one closer to the face of a user when the ear level part 2 is worn in the user's ear 20.

In an exemplary embodiment the tabs 8, 9 may be made of a soft and/or flexible material such as soft silicone rubber.

Furthermore, a cable 10 may be arranged to electrically connect the ear level part 2 with the behind the ear part 15. The cable 10 may exit from the body 3 at an exit point 11 in the lateral face of the body 3. In an exemplary embodiment, the exit point 11 may be next to the upper tab 8, in particular next to the second end 8.2 of the loop of the upper tab 8, in some examples such that the second end 8.2 is closer to the face of the user than the exit point 11 when the ear level part 2 is worn within the user's ear.

The cable 10 may be a flexible cable, e.g. a plastically deformable cable, in particular configured as described in EP 3 758 393 A1 which is hereby incorporated by reference in its entirety.

Figure 3:
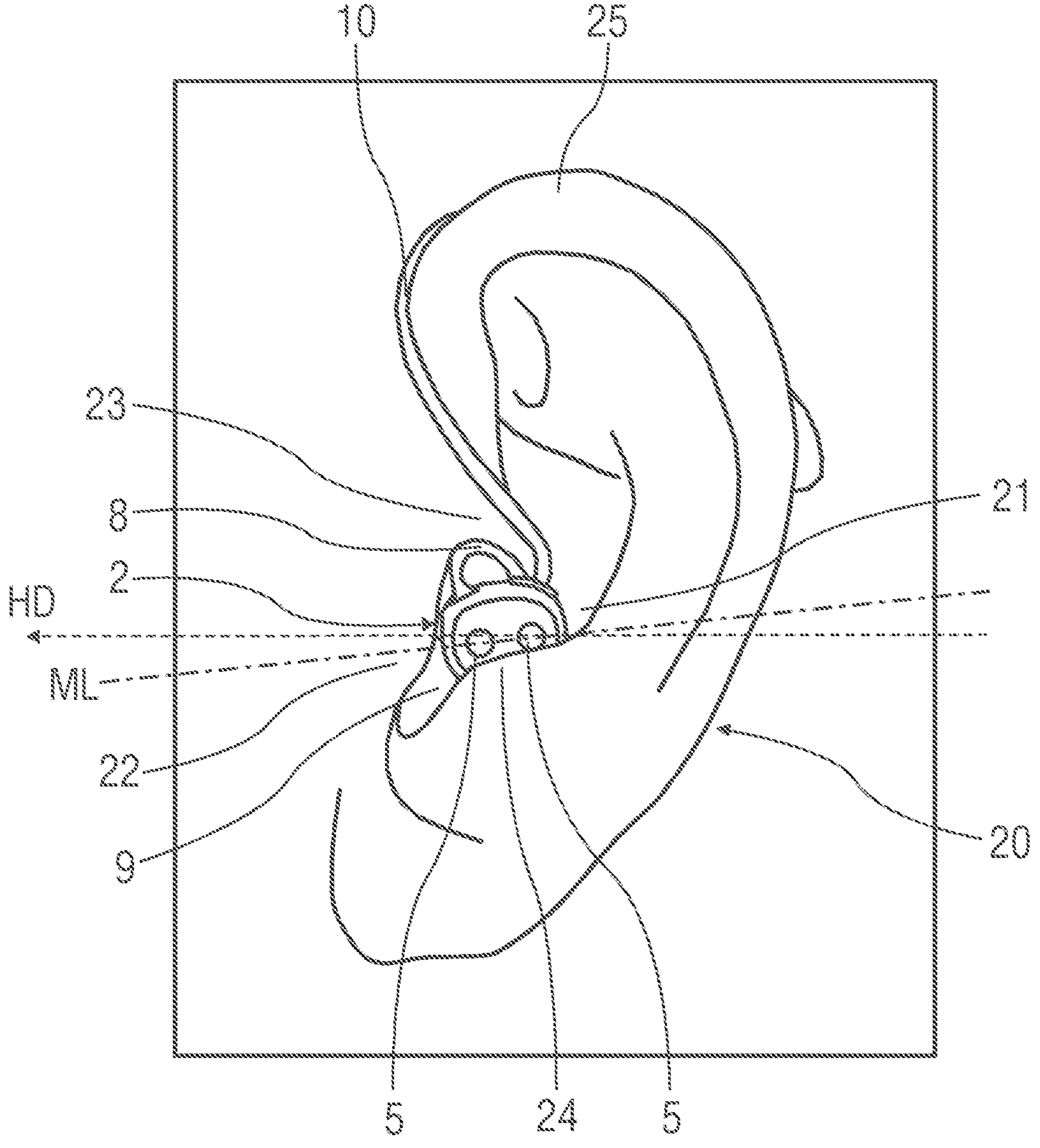
FIG. 3 is a schematic view of an ear with the hearing device installed.
Figure 4:
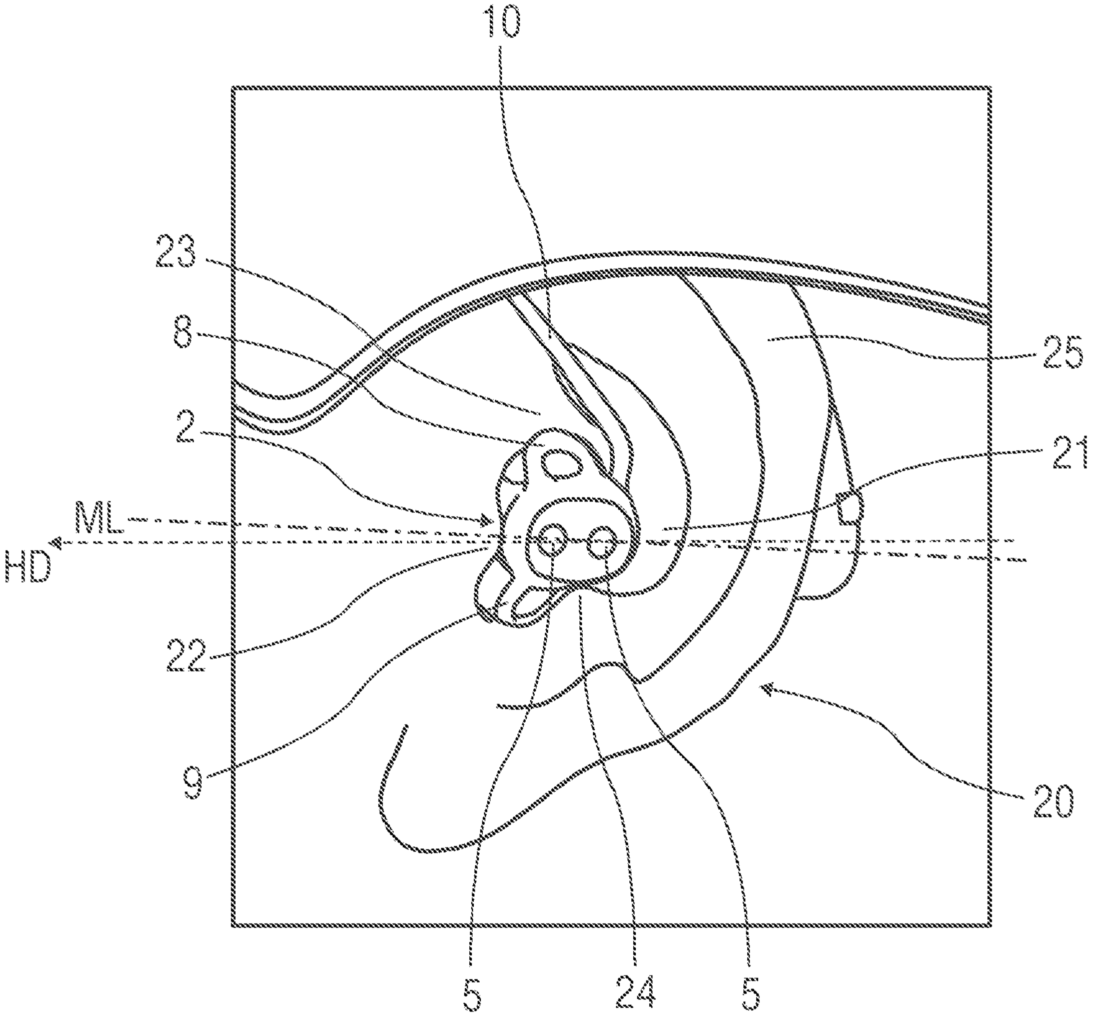
FIG. 4 is a schematic view of another ear with the hearing device installed.
Figure 5:
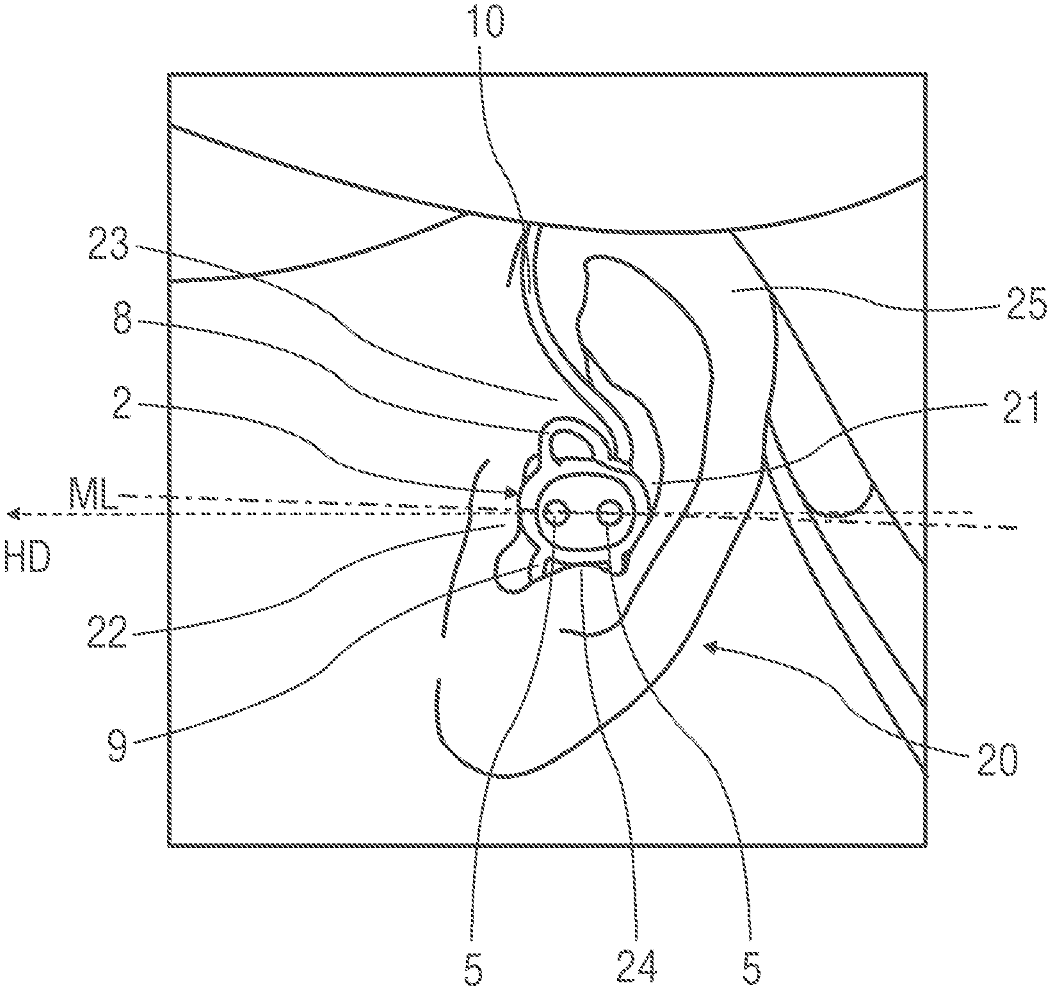
FIG. 5 is a schematic view of yet another ear with the hearing device installed.

FIG. 3 is a schematic view of an ear 20 with the hearing device 1 installed. FIG. 4 is a schematic view of another ear 20 with the hearing device 1 installed. FIG. 5 is a schematic view of yet another ear 20 with the hearing device 1 installed. The ear level part 2 is arranged with the dome 16, i.e. the socket 6 and collar 7, within the ear canal or the entrance thereof and with the body 3 within the concha 21 such that the upper tab 8 is positioned above the tragus 22 while the lower tab 9 is positioned beneath the tragus 22. In particular, the upper tab 8 may be positioned between the tragus 22 and the crus helicis 23 and the lower tab 9 may be positioned between the tragus 22 and the antitragus 24. This ensures a position of the ear level part 2 such that the microphone line ML defines a microphone plane which is essentially horizontal or which deviates by at most +/−15 degrees from a horizontal direction HD when the user maintains an upright head posture. The upright head posture may be a head posture in which the person looks directly ahead. In an exemplary embodiment, the microphone line ML may lie on the tragus 22, in particular on a central region of the tragus 22, e.g. a central third, a central fourth, a central fifth, a central sixth, a central seventh or a central eighth of the tragus 22.

In an exemplary embodiment, the upper tab 8 and the lower tab 9 may be arranged such that a perpendicular on the microphone line ML in the middle between the two microphones 13 lies on the antitragus 24, in particular on a central region of the antitragus 24, e.g. a central third, a central fourth, a central fifth, a central sixth, a central seventh or a central eighth of the antitragus 24.

Due to the configuration of the ear level part 2, in particular the tabs 8, 9, this may be ensured for any ear in which the ear level part 2 will be arranged.

The cable 10 exits essentially upward from the body 3 and is run around the helix 25 to the behind the ear part 15 which is positioned behind the ear 20.

Positioning the dome 16 at the entrance of the ear canal may reduce the level of irritation that typically occurs when using standard RIC domes that reside deeper inside the ear canal.

The above described hearing device 1 is a self-fitting one size fits all device that maintains good directional performance while accommodating mild to moderate hearing loss.

In an exemplary embodiment, the ear level part 2, in particular the flange 12 may comprise a vent 31, e.g. a simple vent or an active vent. The vent 31 may be arranged within the collar portion 19 having the oval cross section outside the pipe shaped part of the flange 12 holding the receiver 14 and/or defining the acoustic channel. This way, the space within the collar portion 19 is efficiently used thus allowing for a compact design.

Figure 7:
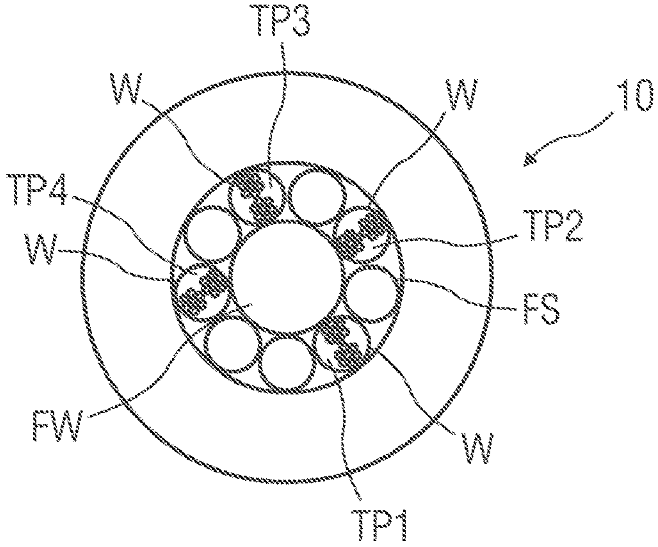
FIG. 7 is a schematic sectional view of a cable.

In an exemplary embodiment, the cable 10 may also be configured as follows:

FIG. 7 is a schematic sectional view of a cable 10, in particular for use in a hearing device, e.g. for connecting a transducer module 30 comprising multiple transducers such as one or more microphones and/or one or more receivers.

A specific physical arrangement of conductors in the cable 10 is proposed to minimize the effects of crosstalk/cross-contamination and noise pickup. In the example given herein, a total of eight conductors are assumed, in the following configuration:

- two input lines TP1 as a twisted pair, for example two microphone signal lines,
- two power supply lines TP2 as a twisted pair, for example a positive voltage supply line and a negative voltage supply line for a microphone,
- two ground lines TP3 as a twisted pair, for example double-redundant ground for shielding,
- two output lines TP4 as a twisted pair, for example two receiver drive lines.

In other embodiments, the signals may be distributed in a different way to the twisted pairs TP1 to TP4. For example, twisted pair TP1 may carry a signal line and one power line and twisted pair TP2 may carry another signal line and another power line.

These eight lines TP1 to TP4 are wound around a central core wire FW which may be made of a malleable material, e.g. a stainless-steel forming wire, that allows shaping of the cable 10 to suit a given physical application allowing for flexibility and shaping by a user.

To minimize crosstalk and noise, the eight lines are arranged around the core wire FW as twisted pairs TP1 to TP4 with filler strands FS which may be made of a non-conductive material, e.g. clear polyamide (nylon) filler wires, in between the pairs to reduce coupling and produce a smoother outer finish around the entire cable assembly.

In the embodiment shown one filler strand FS is arranged between the twisted pairs TP1 and the twisted pairs TP2, one filler strand FS is arranged between the twisted pairs TP2 and the twisted pairs TP3, one filler strand FS is arranged between the twisted pairs TP3 and the twisted pairs TP4, and two filler strands FS are arranged between the twisted pairs TP4 and the twisted pairs TP1. The skilled person readily understands that different configurations, in which different numbers of filler strands FS are arranged between the twisted pairs TP1 to TP4 are possible.

Moreover, the skilled person readily understands that though four twisted pairs or eight conductors are used in the illustrated embodiment, the solution is applicable to any arrangement if there is an even number of conductors. If the number of conductors is odd, the solution may be applied to an even number subset of the conductors.

Figure 8:
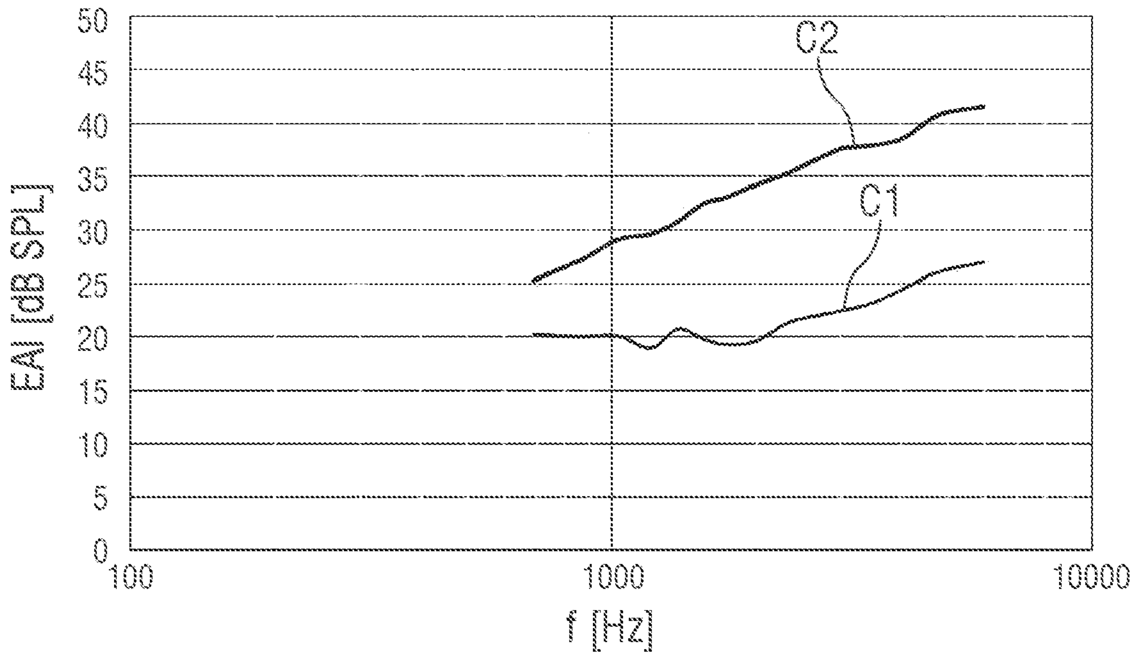
FIG. 8 is a schematic diagram showing crosstalk for different conductor/signal assignments.

To demonstrate the efficacy of the twisted pair scheme and as an example, some measurements of crosstalk are shown in the schematic diagram of FIG. 8 for different conductor/signal assignments. FIG. 8 shows electrical crosstalk at 0 dB FS, wherein equivalent acoustic input EAI in dB. SPL is shown over frequency f. In this example, these measurements have been obtained by driving a nominally 200 Ohm receiver with a 900 mV RMS signal across the frequencies shown. A microphone (sensitivity −37.0 dB re 1V/1 Pa) had its output, power supply and ground lines connected through the cable 10, parallel to the receiver signals. The crosstalk magnitude was taken as the microphone output voltage with no acoustic signal; only the crosstalk-induced signal was present (alongside inherent electrical noise). This voltage was then converted to dB SPL to produce the resulting plots.

The equivalent acoustic input EAI as measured by the microphone input stage shows a decrease of about 15 dB across most of the frequency range measured for curve C1 referring to the receiver drive lines arranged as twisted pair TP4 as opposed to curve C2 referring to the receiver drive lines arranged non-twisted.

There may be some variability depending on which conductors carry which signals around the core wire FW and this is especially evident in the non-twisted pair cases. Having microphone and receiver lines further apart on the cable cross-section appears to decrease the crosstalk. Nonetheless, the twisted pair configuration yields much lower crosstalk overall.

It should also be noted that the crosstalk increases with frequency so that any harmonics of the drive signal will be more strongly coupled to the microphone than the fundamental. Reducing crosstalk then has the added benefit of reducing the distortion coupled back to the microphone output.

In an exemplary embodiment the core wire FW may be grounded to improve noise reduction.

In an exemplary embodiment a shielding wrap W may be arranged around the interfering signals, e.g. TP1 and/or TP4, to improve noise reduction.

In an exemplary embodiment at least one end of the cable 10 may comprise a connector comprising a plurality of pins respectively electrically connected to at least one of the conductors of the cable 10. In an exemplary embodiment both ends of the cable 10 may comprise a connector.

In an exemplary embodiment the core wire FW may be mechanically fixed to the connector.

In an exemplary embodiment, a kit may be provided, comprising two, three or more cables 10 as described above, the cables 10 having different lengths. This may facilitate a hearing aid professional to customize a hearing aid to the geometry of an ear of a user.

Figure 9:
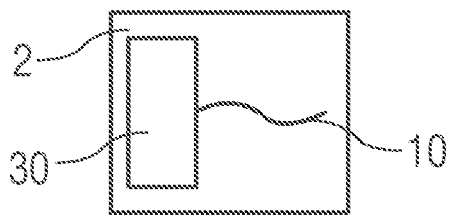
FIG. 9 is a schematic view of a hearing device having a transducer module and a cable according to FIG. 6.

FIG. 9 is a schematic view of a hearing device 1 having a transducer module 30 or another electronic component or module such as a sensor or sensor module and a cable 10 according to FIG. 7 connecting the transducer module 30.

LIST OF REFERENCES

1 hearing device
2 ear level part
3 body
4 face plate
5 microphone opening
6 socket
7 collar
8 upper tab
8.1 first end
8.2 second end
9 lower tab
9.1 first end
9.2 second end
10 cable
11 exit point
12 flange
13 microphone
14 receiver
15 behind the ear part
16 dome
17 sound exit
18 filter
19 collar portion
20 ear
21 concha
22 tragus
23 crus helicis
24 antitragus
25 helix
30 transducer module
31 vent
C1 to C10 curve
EAI equivalent acoustic input
f frequency
FS filler strand
FW core wire
ML microphone line
TP1 twisted pair, input lines
TP2 twisted pair, power supply lines
TP3 twisted pair, ground lines
TP4 twisted pair, output lines
W shielding wrap

What is claimed is:

1. An ear level part for a hearing device, the ear level part comprising:
a body containing at least two microphones acoustically connected to at least two microphone openings, the at least two microphone openings arranged in a microphone line, the body further comprising a flange, wherein a receiver is arranged within the body, wherein the flange has a sound exit for the receiver,
an upper tab generally protruding in a lateral direction from the body and configured to be positioned above the tragus of a user's ear and a lower tab generally protruding in a lateral direction from the body and configured to be positioned beneath the tragus of the user's ear thereby aligning the ear level part in such a way that one or more of the following applies:
the microphone line is horizontal,
the microphone line deviates by an angle of at most +/−15 degrees from a horizontal direction when the user maintains an upright head posture,
the microphone line lies on the tragus,
a perpendicular on the microphone line in the middle between the two microphones lies on the antitragus of the user's ear.

2. The ear level part according to claim 1, wherein the upper tab is configured to be positioned above the tragus of a user's ear and the lower tab is configured to be positioned beneath the tragus of the user's ear thereby aligning the ear level part in such a way that the microphone line lies on a central region of the tragus.

3. The ear level part according to claim 1, wherein the upper tab is configured to be positioned between the tragus and the crus helicis.

4. The ear level part according to claim 1, wherein the lower tab is configured to be positioned between the tragus and the antitragus.

5. The ear level part according to claim 1, wherein the flange comprises an oval cross section, wherein a main axis of the oval cross section of the flange is one of:

perpendicular relative to the microphone line, and deviating from being perpendicular by at most +/−15 degrees.

6. The ear level part according to claim 1, further comprising:

a dome arranged at a medial end of the body, the dome comprising a socket and a collar, the collar being arranged at a medial end of the socket generally extending back in a distal direction thus at least partially enclosing the socket, wherein the collar is configured to flare in the distal direction, wherein the socket is connected with the flange.

7. The ear level part according to claim 1, wherein the receiver is arranged within the flange.

8. The ear level part according to claim 1, wherein at least one of the upper tab and the lower tab comprises a loop defining one of an opening and an eye generally extending in one of a distal direction and a medial direction through the respective tab.

9. The ear level part according to claim 8, wherein the loop has a first end and a second end respectively protruding from a lateral face of the body, wherein the first end protrudes in a direction which is closer to a radial direction while the second end protrudes in a direction which is closer to a tangential direction.

10. The ear level part according to claim 9, wherein the respective first end of the loops is positioned to be closer to the face of the user than the second end when the ear level part is worn within the user's ear.

11. The ear level part according to claim 1, wherein the upper tab is smaller than the lower tab.

12. The ear level part according to claim 1, further comprising an exit point for a cable, the exit point arranged in a lateral face of the body next to the upper tab.

13. The ear level part according to claim 12, wherein the upper tab comprises a loop defining one of an opening and an eye generally extending in one of a distal direction and a medial direction through the respective tab, wherein the loop has a first end and a second end respectively protruding from a lateral face of the body, wherein the first end protrudes in a direction which is closer to a radial direction while the second end protrudes in a direction which is closer to a tangential direction, wherein the exit point is next to the second end of the loop of the upper tab such that the second end is closer to the face of the user than the exit point when the ear level part is worn within the user's ear.

14. The ear level part according to claim 1, wherein the flange comprises a vent.

15. A hearing device, comprising an ear level part, a behind the ear part and a cable, the ear level part comprising:

a body containing at least two microphones acoustically connected to at least two microphone openings, the at least two microphone openings arranged in a microphone line, the body further comprising a flange, wherein a receiver is arranged within the body, wherein the flange has a sound exit for the receiver, the cable electrically connecting the behind the ear part to the at least two microphones and to the receiver of the ear level part;

an upper tab generally protruding in a lateral direction from the body and configured to be positioned above the tragus of a user's ear and a lower tab generally protruding in a lateral direction from the body and configured to be positioned beneath the tragus of the user's ear thereby aligning the ear level part in such a way that one or more of the following applies:

the microphone line is horizontal, the microphone line deviates by an angle of at most+/15 degrees from a horizontal direction when the user maintains an upright head posture, the microphone line lies on the tragus, a perpendicular on the microphone line in the middle between the two microphones lies on the antitragus of the user's ear.

16. The hearing device according to claim 15, wherein the cable is a plastically deformable cable.

* * * * *